(12) United States Patent
Klement et al.

(10) Patent No.: US 9,696,482 B2
(45) Date of Patent: Jul. 4, 2017

(54) BACKLIGHT DIMMING FILM

(71) Applicant: Google Technology Holdings LLC, Mountain View, CA (US)

(72) Inventors: Alexander Klement, Palatine, IL (US); Mark F. Valentine, Kenosha, WI (US); Chien-Hui Wen, Vernon Hills, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 91 days.

(21) Appl. No.: 14/280,705

(22) Filed: May 19, 2014

(65) Prior Publication Data

US 2015/0185397 A1  Jul. 2, 2015

Related U.S. Application Data

(60) Provisional application No. 61/921,642, filed on Dec. 30, 2013.

(51) Int. Cl.
*F21V 8/00* (2006.01)
*G09G 3/34* (2006.01)

(52) U.S. Cl.
CPC ......... *G02B 6/0035* (2013.01); *G09G 3/3406* (2013.01); *G09G 2320/0626* (2013.01)

(58) Field of Classification Search
CPC ............... G02B 6/0035; G09G 3/3406; G09G 2320/0626
See application file for complete search history.

(56) References Cited

U.S. PATENT DOCUMENTS

| | | |
|---|---|---|
| 6,906,762 B1 | 6/2005 | Witehira et al. |
| 7,071,907 B1 | 7/2006 | Duboc, Jr. et al. |
| 7,663,705 B2 | 2/2010 | Asahi et al. |
| 8,368,637 B2 | 2/2013 | Choi |
| 8,368,838 B2 | 2/2013 | Kumasaka et al. |
| 8,368,992 B2 | 2/2013 | Neuman et al. |
| 8,408,775 B1 | 4/2013 | Coleman |
| 2005/0128370 A1 | 6/2005 | Moon |
| 2009/0201301 A1* | 8/2009 | Mienko ............... G02B 6/0016 345/501 |
| 2014/0293188 A1* | 10/2014 | Chen .................... G09G 3/3426 349/65 |
| 2015/0227003 A1* | 8/2015 | Ninan .................. G09G 3/3426 359/237 |

* cited by examiner

*Primary Examiner* — Ibrahim Khan
(74) *Attorney, Agent, or Firm* — Blakely Sokoloff Taylor & Zafman LLP

(57) ABSTRACT

This document describes techniques and apparatuses for implementing backlight dimming film. These techniques may be performed using a side entry lightguide structure having a receiving side and an output surface. The lightguide structure receives light through the receiving side and redirects the light so that it is output through the output surface. The techniques are also performed relative to a cover screen structure that receives light from the output surface of the lightguide structure and filters the light to display an image. A dimming film is disposed between the output surface of the lightguide structure and the cover screen structure. The dimming film is controlled to block light output from the output surface of the lightguide structure from being received at the cover screen structure.

21 Claims, 6 Drawing Sheets

BACKLIGHT DIMMING FILM

CROSS-REFERENCE TO RELATED APPLICATIONS

This application claims the benefit of U.S. Provisional Application No. 61/921,642, filed on Dec. 30, 2013, the contents of which are incorporated herein by reference.

BACKGROUND

This background description is provided for the purpose of generally presenting the context of the disclosure. Unless otherwise indicated herein, material described in this section is neither expressly nor impliedly admitted to be prior art to the present disclosure or the appended claims Local dimming is a technique used in some light emitting diode (LED) televisions (TVs) to improve the contrast ratio of an image, thereby producing a "darker" or "deeper" black color. To achieve local dimming, LED TVs may employ top-firing LEDs. Top-firing LEDs emit light in a direction that is perpendicular to a screen on which the image is displayed, each LED corresponds to a small portion of the screen, and may be individually dimmed or illuminated. Thus, portions of the screen may be dimmed simply by turning off the corresponding LEDs.

Employing top-firing LEDs in mobile devices may be impractical, however. With regard to mobile devices, thickness of the device is a consideration. The thickness of a device that uses top-firing LEDs may be appreciably greater than that of a device that uses other screen-lighting implements, such as-side firing LEDs. To reduce the thickness, therefore, mobile devices may be configured with side-firing LEDs. Conventional techniques to dim images displayed on a device with side-firing LEDs, however, fail to suitably improve the contrast of those images.

BRIEF DESCRIPTION OF THE DRAWINGS

Techniques and apparatuses enabling a backlight dimming film are described with reference to the following drawings. The same numbers are used throughout to reference like features and components.

DETAILED DESCRIPTION

To reduce a thickness of devices, side-firing light emitting diodes (LEDs) can be employed. Side-firing LEDs are located off to a side of the screen and emit light in a direction parallel to the screen. In contrast, top-firing LEDs are located behind a screen on which images are displayed and emit light in a direction perpendicular to the screen to illuminate the screen. With side-firing LEDs, however, the light emitted by the LEDs is redirected through a backlight lightguide. Once redirected, the light is then emitted in a direction perpendicular to the screen and can illuminate the screen. Due in part to the structural differences between top-firing and side-firing LEDs (e.g., LEDs being located at a side and the presence of the backlight lightguide), the local dimming techniques used for devices with top-firing LEDs to produce the "darker" or "deeper" black color and reduce power consumption of those devices are not usable for devices with side-firing LEDs. Some conventional techniques to dim images displayed on a device with side-firing LEDs include using specialized lightguides and/or mounting LEDs on multiple sides of the display. The conventional techniques fail to suitably improve the contrast of the displayed images and consume much-needed power, however.

This disclosure describes techniques and apparatuses for backlight dimming film. Backlight dimming film may be employed to achieve local dimming for devices that have backlight lightguides (e.g., that redirect light emitted from side-firing LEDs to illuminate a display), and thus produce a "darker" or "deeper" black color for display while also reducing power consumption of those devices. Not only does the backlight dimming film enable a "darker" or "deeper" black to be produced, but it also allows for localization of the dimming, such that some portions of a display may be blackened, while other portions allow light from the lightguide to illuminate the display. Although use of backlight dimming film is effective to produce a "darker" or "deeper" black color and reduce power consumption for devices, its use does not add significantly to the thickness of those devices. Consequently, use of backlight dimming film to achieve local dimming results in devices that are appreciably thinner than devices with top-firing LEDs.

The following discussion first describes an operating environment, followed by techniques that may be employed in this environment, and ends with example apparatuses.

Operating Environment

Figure 1:
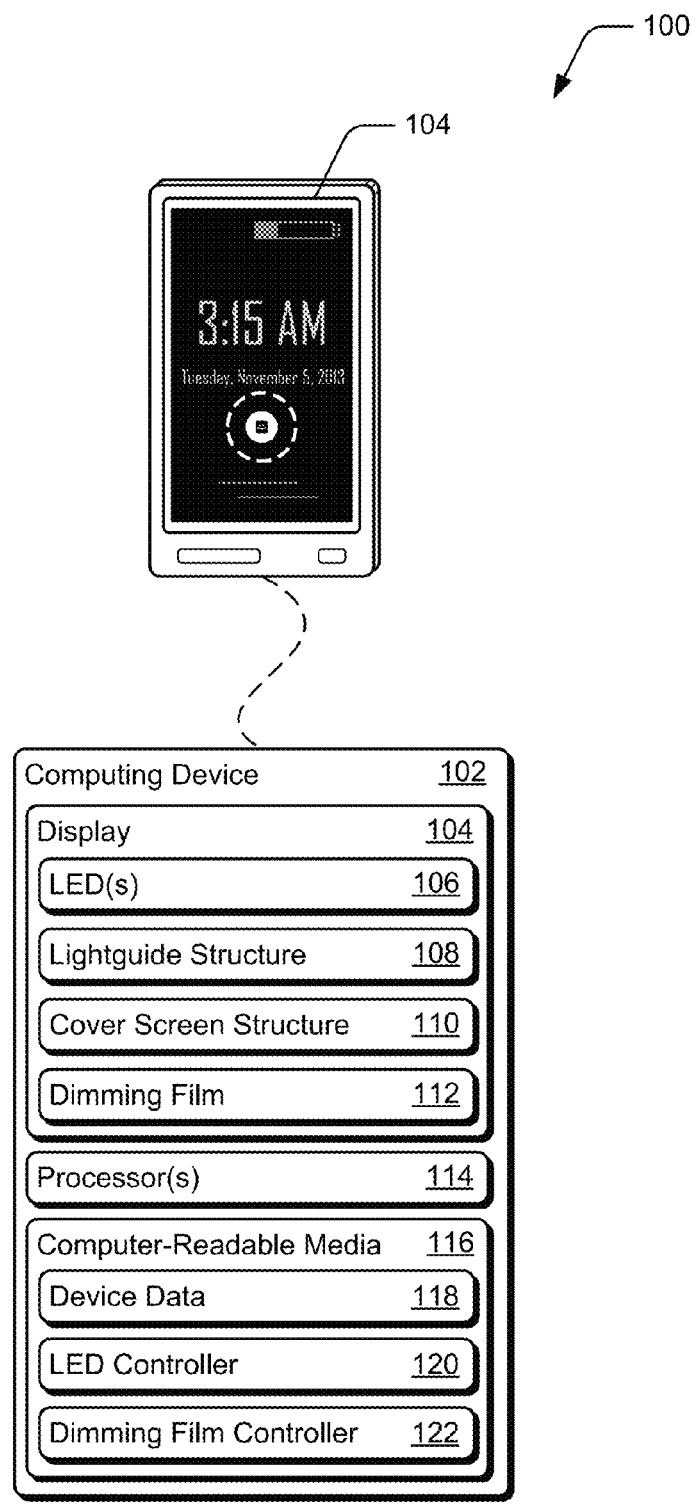
FIG. 1 illustrates an example computing device in which techniques for backlight dimming film can be implemented.

FIG. 1 illustrates an example environment 100 in which techniques described herein can be implemented. Environment 100 includes a computing device 102 having a display 104 on which a variety of images and content may be presented to a user, including, but not limited to, a home screen of the computing device 102, user interfaces for applications of the computing device 102, a screen associated with a sleep or hibernation mode of the computing device 102, digital photographs, movies, television, video games, and so forth. The display 102 can be disposed at least partially within a housing of computing device 102, such that it forms part of the surface of the computing device 102.

Figure 2:
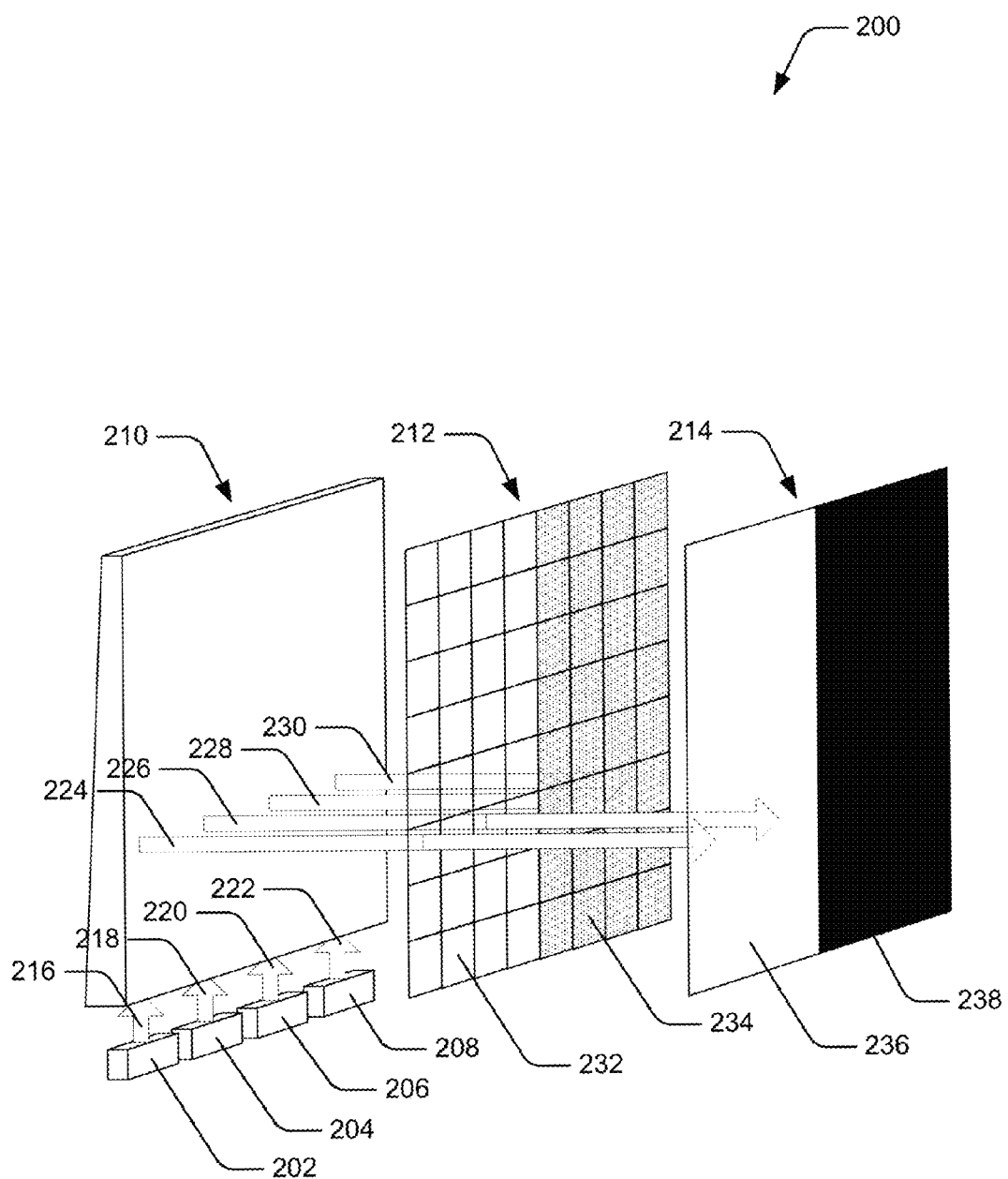
FIG. 2 illustrates portions of the display depicted in FIG. 1, but in greater detail.

Display 104 is illustrated as including light emitting diodes 106 (LEDs 106), lightguide structure 108, cover screen structure 110, and dimming film 112. Generally, the LEDs 106 can emit light that illuminates the display 104 or portions thereof to present images and content. Some devices may use dimming film (e.g., dimming film 112) in conjunction with top-firing LEDs to implement local dimming To achieve a thinner device, however, the LEDs 106 are positioned along just a side of the computing device 102. In other words, the LEDs 106 of computing device 102 are side-firing LEDs. Computing device 102 can be configured so that the LEDs 106 are positioned along a single side of the computing device 102, e.g., along a bottom side as illustrated in FIG. 2. Alternately or in addition, computing device 102 can be configured so that the LEDs 106 are positioned along multiple sides, such as along a left and right side, along a top side and bottom side, and so on.

With reference to FIGS. 1 and 2, the lightguide structure 108, 210 redirects light emitted from the LEDs 106, 202, 204, 206, 208 so that the light can be received by the cover screen structure 110, 214. In general, the LEDs 106, 202, 204, 206, 208 emit light in a direction that is parallel to the viewing surface of cover screen structure 110. The lightguide structure 108 receives this light through a receiving side. Within the lightguide structure 108, the light is then internally reflected, according to a configuration of the lightguide structure 108, and output through an output surface. For example, the output surface may output the light in a direction that is substantially perpendicular to the viewing surface of the cover screen structure 110. In this example, therefore, the lightguide structure 108 redirects the light emitted from the LEDs 106 by an angle of approximately ninety degrees (90°). As used herein, the viewing surface of the cover screen structure refers to the surface of the cover screen structure that faces a user viewing the display device, and in the illustrated example is the large surface of an elongated display. The exact geometry of the display may vary without departing from the invention. As used herein, substantially perpendicular refers to side entry and may be within a range of 70 to 120 degrees.

Regardless of how the lightguide structure 108 redirects the light emitted from the LEDs 106, that light is used to illuminate portions of the cover screen structure 110 to display images and content. By way of example, the cover screen structure 110 may be configured as an LED LCD (liquid crystal display) that includes a top glass, liquid crystal material, and a bottom glass. The light output from the output surface of the lightguide structure 108 may be filtered through top glass, liquid crystal material, and bottom glass to display images and content. Although an LED LCD configuration is discussed, other configurations of the cover screen structure 110 may be employed without departing from the spirit or the scope of the described techniques.

To implement backlight dimming film techniques, dimming film 112, 212 may be placed between the lightguide structure 108, 210 and the cover screen structure 110, 214. The dimming film 112 may be used with differently configured backlight lightguides. In other words, the dimming film 112 is effective to cause portions of a displayed image to be dimmed regardless of whether the lightguide comprises a single manufactured piece, multiple manufactured pieces that are fixed together, has channels to direct light emitted by the LEDs 106, does not have such channels, and so on. Although the dimming film 112 may be implemented as a "film", it may also be implemented using a substrate layer and a deposition and/or etching technique.

Further, the dimming film 112, 212 can be controlled to allow light output from the output surface of the lightguide structure 108, 210 to be received at the cover screen structure 110, 214. The dimming film 112, 212 can also be controlled to block the light output from the output surface so that it is not received at the cover screen structure 110, 214. Moreover, individual regions of the dimming film 112, 212 can be controlled to allow light to be received at some portions of the cover screen structure 110, 210 but not others. In this way, some portions of the cover screen structure 110, 210 may be selectively illuminated while other portions are dimmed (e.g., blacked out).

The dimming film 112, 212 may be made of materials, such as lithium niobate, that have a refractive index that changes according to a local electrical field's strength. Refractive index refers to how light, or any other radiation propagates through a medium. By changing the refractive index of the material beyond a threshold, total internal reflection of light may be achieved at the dimming film 112. When total internal reflection of the light is achieved by the dimming film 112, the reflected light is forced back into the lightguide structure 108.

Accordingly, the dimming film 112 may be controlled by manipulating a refractive index of the materials of the dimming film 112 (e.g., applying electrical fields). By varying the strengths of the electrical fields applied to the dimming film 112, different degrees of dimming may be achieved for a single portion of the cover screen structure 110. In addition, the electrical fields may be varied across the dimming film 112 to vary the dimness at different portions of the cover screen structure 110. For example, an electrical field may be applied to a region of the dimming film 112 to enable 100% of the light to pass through the dimming film 112. An electrical field may also be applied to the same region (but at another time) or to a different region of the dimming film 112 so that 100% of the light is blocked (e.g., by total internal reflection). The regions of the dimming film 112 are also configured so that a percentage of light between these two extremes (e.g., 1%, 2%, 10%, and the like) can be blocked based on an electrical field applied to the respective region. The film thus blocks an amount of light in proportion to the control field, and may vary the amount of light passed any amount of light between 0 and 110%, and may change from transparent to translucent under the control field applied.

When the dimming film 112 blocks the light, it is reflected back into the lightguide structure 108 as described above. The lightguide structure 108 may then use this reflected light, in addition to that emitted from the LEDs 106, to illuminate the display 104. The light blocked by the dimming film 112 is thus considered to be "recycled" because it is eventually used to illuminate the display 104. In contrast, conventional techniques may allow light, emitted from LEDs to illuminate a display, to leak out through the display (or waste the light in other ways). By recycling the light blocked by the dimming film 112, however, an amount of light emitted by the LEDs 106 may be reduced. Despite the reduced amount of light from the LEDs 106, images or content may be displayed via the display 104 with a same brightness due to the recycled light. In this manner, when an image displayed on the screen is smaller than the entire available screen, less light may be emitted by the LEDs 106 without reducing the brightness of the displayed image. The portion(s) of the screen where an image is displayed may be considered the "active region" of the display (in contrast to an "inactive region" which portion(s) of the screen have no image to be displayed).

Reducing the amount of light emitted by the LEDs 106 is also effective to reduce power consumed by the LEDs 106 while producing a bright image in the active region of the display. The dimming film allows the active region of the display to be brightly lit using a smaller voltage than would be required to produce the same brightness of light over the active region if the dimming film were not used to recycle light. Consequently, the backlight dimming film techniques described herein may reduce the power consumption of the computing device 102, which may be a substantial consideration in developing battery-powered devices e.g., mobile phones, tablet devices, navigation devices, portable televisions, and so on.

Computing device 102 can be, or include, many different types of computing or electronic devices capable of implementing backlight dimming film techniques. In this example, computing device 102 is shown as a smart phone, though other devices are contemplated. Other computing devices 102 may include, by way of example and not limitation, a mobile phone, notebook computer (e.g., netbook or ultrabook), camera (compact or single-lens reflex) smart-watch, smart-glasses, tablet computer, personal media player, personal navigating device (e.g., global positioning system), gaming console, desktop computer, video camera, or portable gaming device.

Computing device 102 includes processor 114, which may be configured as a single or multi-core processor capable of enabling various functionalities of computing device 102. In some cases, processor 114 includes a digital-signal processing (DSP) subsystem for processing various signals or data of computing device 102. Processor 114 may be coupled with, and may implement functionalities of, any other components or modules of computing device 102 that are described herein.

Computing device 102 includes computer readable-media 116. Computer-readable media 116 (CRM 116) include device data 118, such as an operating system, firmware, or applications of computing device 102 that are executable by processor 114. Alternately or additionally, device data 118 may include various user data, such as images, music, documents, emails, contacts, and the like. CRM 116 also include LED controller 120 and dimming film controller 122, which in this example are embodied as computer-executable code stored on CRM 116.

LED controller 120 controls LEDs 106 to emit light in a manner that produces the images and content presented on display 104. For example, the LED controller 120 can alter which of the LEDs 106 emit light, an amount of light or an intensity of light emitted by each of the LEDs 106, if the LEDs 106 are colored then color(s) of light emitted by the LEDs 106, and so on. The LED controller 120 also controls the LEDs 106 over time to emit light to change the images and content presented on display 104. The LED controller 120 may receive image data indicative of an image that is to be presented on display 104 at a given time. The LED controller 120 can then, in accordance with the image data, alter the light emitted by the LEDs 106, such as in the manners described above. Further implementations and uses of LED controller 120 vary and are described below.

Dimming film controller 122 controls dimming film 112 to allow light to pass through to the cover screen structure 110 or to block the light so that it is not passed through. For example, the dimming film controller 122 can alter which regions of the dimming film 112 allow light to pass through, which regions of the dimming film 112 block the light so that it is not passed through, an amount of light that passes through each region of the dimming film 112, and so on. To do so, the dimming film controller 122 alters the electrical fields applied to individual regions of the dimming film 112. Like the LED controller 120, the dimming film controller 122 may receive image data indicative of an image that is to be presented on display 104 at a given time. The dimming film controller 122 can then, in accordance with the image data, alter which regions of the dimming film 112 allow light to pass through and an amount of light that those regions allow through. Further implementations and uses of dimming film controller 122 vary and are described below in greater detail. The dimming film controller 122 controls the dimming film such that the region, or regions, of the display that are active can be finely controlled.

Further, the computing device may contain a cover screen controller (not shown) generating an image that is to be presented. The cover screen controller can then, in accordance with the image data, present an image using the light emitted by the controlled LEDs 106, 202, 204, 206, 208 passed via the light dimming film 112, 214.

Further, computing device 102 may include data interfaces for communicating data via a network or other connection. In some cases, these data interfaces are wireless transceivers for communicating via a wireless network (not shown) or directly with other devices, such as by near-field communication (NFC). Examples of these wireless networks include a wireless wide-area networks (WWAN), wireless local-area network (WLAN), and wireless personal-area network (WPAN), each of which may be configured, in part or entirely, as infrastructure, ad-hoc, or mesh networks. For example, an interface configured as a short-range wireless transceiver may communicate over a WPAN in accordance with a Bluetooth™ protocol.

Alternately or additionally, the data interfaces include wired data interfaces for communicating with other devices, such as local area network (LAN) Ethernet transceiver, serial data interface, audio/video port (e.g., high-definition multimedia interface (HDMI) port), or universal serial bus (USB) port. These wired data interfaces may be implemented using standard connectors or through the use of proprietary connectors and associated cables providing enhanced security or interconnect density.

Computing device 102 may also include sensors, which enable computing device 102 to sense various properties, variances, or characteristics of an environment in which computing device 102 operates. These sensors may include any suitable type of sensor, such as an infrared sensor, proximity sensor, light sensor, acoustic sensor, magnetic sensor, temperature/thermal sensor, micro-electromechanical systems (MEMS), camera sensor (e.g., charge-coupled device sensor or complementary-metal-oxide semiconductor sensor), capacitive sensor, and so on. In some cases, the sensors enable interaction with, or receive input from, a user of computing device 102. In such a case, the sensors may include piezoelectric sensors, capacitive touch sensors, input sensing-logic associated with hardware switches (e.g., keyboards, snap-domes, or dial-pads), and so on.

More specifically, consider FIG. 2, which illustrates portions of the display depicted in FIG. 1, but in greater detail.

In particular, FIG. 2 illustrates at 200 an exploded view of a display, such as display 104, and includes LEDs 202, 204, 206, 208, lightguide structure 210, dimming film 212, and cover screen structure 214, which may correspond to the respective components of display 104 illustrated in FIG. 1.

By way of example, arrows 216, 218, 220, 222 of FIG. 2 represent light that is emitted from LEDs 202, 204, 206, 208 into a receiving side of the lightguide structure 210. The LEDs 202, 204, 206, 208 are controlled by the LED controller 120 to emit the light represented by arrows 216, 218, 220, 222. As such, the light represented by arrows 216, 218, 220, 222 may be of different intensities, different colors, change at different times, and so on to produce an image on the cover screen structure 214. Although each of LEDs 202, 204, 206, 208 are illustrated emitting light, fewer than each of the LEDs may emit light at a given time according to the image that is to be produced. Additionally, more or fewer LEDs than those illustrated in FIG. 2 may be included as part of a display (e.g., a display may include 3 LEDs, 5 LEDs, 10 LEDs, and so on).

In FIG. 2, the LEDs 202, 204, 206, 208 are depicted along only a single side of the lightguide structure 210. Although the backlight dimming film techniques described herein achieve local dimming with such configurations, these techniques may also be implemented to achieve local dimming with other configurations, such as those in which LEDs are located along multiple sides of a backlight or behind a backlight (e.g., top-firing LEDs). Further, the arrows 216, 218, 220, 222 indicate that the light emitted from the LEDs 202, 204, 206, 208 is emitted in a direction that is substantially parallel to the cover screen structure 214.

The arrows 224, 226, 228, 230 represent light that is output from the output surface of the lightguide structure 210. The light represented by arrows 224, 226, 228, 230 corresponds to that redirected through the lightguide structure 210. For example, the lightguide structure 210 can receive the light represented by arrows 216, 218, 220, 222 (emitted by LEDs 202, 204, 206, 208) through the receiving side. Using internal reflection, the lightguide structure 210 can redirect that light so it is emitted from the output surface. The output surface of the lightguide structure 210 is depicted as being substantially perpendicular to the receiving side of the lightguide structure 210. In this example, arrows 224, 226, 228, 230 indicate that light emitted from the output surface is emitted in a direction that is substantially perpendicular to the cover screen structure 214.

The light emitted from the output surface of the lightguide structure 210 is used to illuminate portions of the cover screen structure 214. Whether a portion of the cover screen structure 214 is illuminated, however, depends on whether a corresponding region of the dimming film 212 allows light to pass to the cover screen structure 214. In the illustrated example, the dimming film 212 is depicted as being divided into a plurality of regions, some of which are illustrated as allowing light to pass through (e.g., regions 232) while others are illustrated as blocking light (e.g., regions 234).

The regions of the dimming film 212 may cover multiple pixels, such that when a region allows light to pass through, multiple pixels are illuminated (and dimmed when the region is activated to block light). Alternately, the regions of the dimming film may each cover only a single pixel, such that when a region allows light to pass through, a single pixel is illuminated (and dimmed when the region is activated to block light). Regardless of a number of pixels covered by each region, the regions of the dimming film 212 may be individually controllable. In this way, a single region of the dimming film 212 may allow at least some light to pass through to the cover screen structure 214, while other regions are activated to block the light. Individual control also enables a single region of the dimming film 212 to be activated to block the light from the cover screen structure 214 while the other regions allow at least some light to pass through.

In FIG. 2, regions 232 of the dimming film 212 are depicted as being deactivated to allow light to pass through. In particular, regions 232 are depicted allowing the light corresponding to arrows 224, 226 to pass through to the cover screen structure 214. As described in greater detail above, an electrical field may be applied to deactivate these regions 232 of the dimming film 212. When deactivated, a region of the dimming film 212 does not reflect light back into the lightguide structure 210. Instead, light is allowed to pass through the region, and a corresponding portion of the cover screen structure 214 is illuminated. In this example, portion 236 of the cover screen structure 214 is covered by regions 232 of the dimming film 212, and thus corresponds to those regions. Since regions 232 allow light to be passed through the dimming film 212, portion 236 is illuminated with the light represented by arrows 224, 226.

In contrast, regions 234 of the dimming film 212 are depicted as being activated to block light from passing through. In particular, regions 234 are depicted blocking light represented by arrows 228, 230 from passing through to the cover screen structure 214. As described in more detail above, an electrical field may be applied to these regions 234 of the dimming film 212 so that they reflect light back into the lightguide structure 210. When light is blocked from being passed through a region of the dimming film, a corresponding region of the cover screen structure 214 is dimmed.

In this example, portion 238 of the cover screen structure 214 is covered by regions 234 of the dimming film 212, and thus corresponds to those regions. Since regions 234 are activated to block light from being passed through the dimming film 212, portion 238 is dimmed. Consequently, the light represented by arrows 228, 230 is forced back into the lightguide structure 210. The lightguide structure 210 receives light reflected by the dimming film through the output surface. Using internal reflection, the lightguide structure 210 redirects the light that is blocked by the dimming film 212 and emits that light through the output surface. This recycled light may also be used to illuminate the cover screen structure 214. Arrows 224, 226 may thus represent recycled light as well as light emitted by the LEDs 202, 204, 206, 208 and redirected through the lightguide structure 210.

Figure 3:
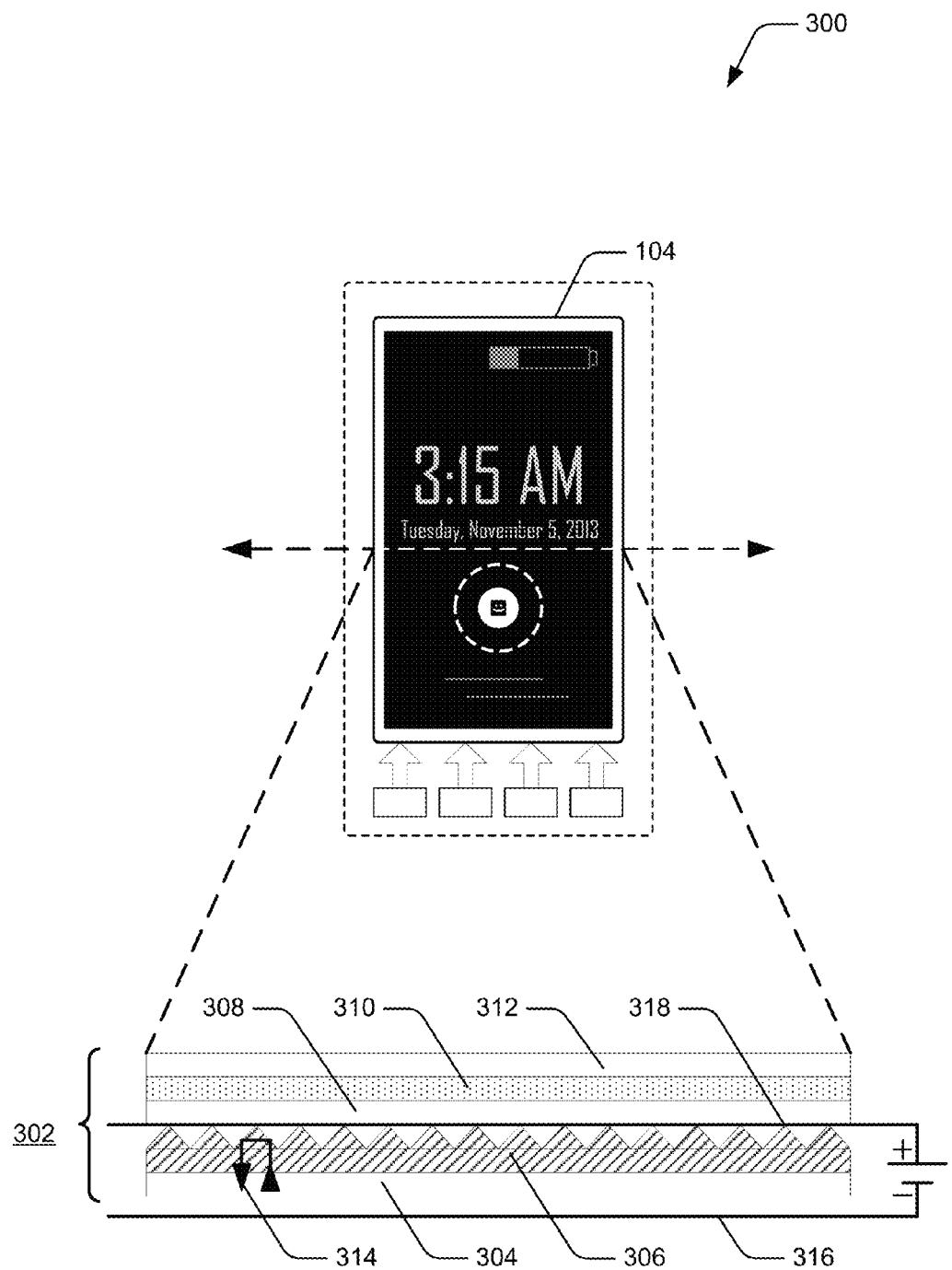
FIG. 3 illustrates another view of portions of the display depicted in FIG. 1, but in greater detail.

FIG. 3 illustrates another view of portions of the display depicted in FIG. 1, but in greater detail. In particular, FIG. 3 illustrates at 300 display 104 and a cross section 302 of the display 104. The cross section 302 of the display 104 includes a backlight lightguide 304, dimming film 306, and a cover screen structure, which includes bottom glass 308, liquid crystal material 310, and top glass 312.

As described in more detail above, portions of the dimming film 306 can be activated to act as an optical barrier. Arrows 314 represent light that is output from the backlight lightguide 304, internally reflected by the dimming film 306, and due to this reflection forced back into the backlight lightguide 304. As indicated by arrows 314, the light blocked by the dimming film 306 is not received at a corresponding portion of the cover screen structure. Instead, the reflected light is recycled and passed through a region of the dimming film that is deactivated, which allows the light to be received eventually at the cover screen structure.

In FIG. 3, the cross section 302 is also illustrated with electrodes 316, 318. In various configurations, such as that illustrated in FIG. 3, the bottom glass 308 of the cover screen structure is used as one of the electrodes (e.g., electrode 318). The electrodes 316, 318 can be controlled (e.g., by dimming film controller 122) to apply electrical fields to individual regions of the dimming film 306. By doing so, the individual regions can be activated to block light or deactivated to allow light to pass through. The electrical fields applied to the dimming film are static, but are also adjustable. By adjusting the electrical fields, the regions of the dimming film 306 can allow a varying amount of light to pass through (e.g., from 0% to 100% of the light). Electrical fields can also be adjusted so that a particular region allows a different amount of light to pass through at different times.

Figure 4:
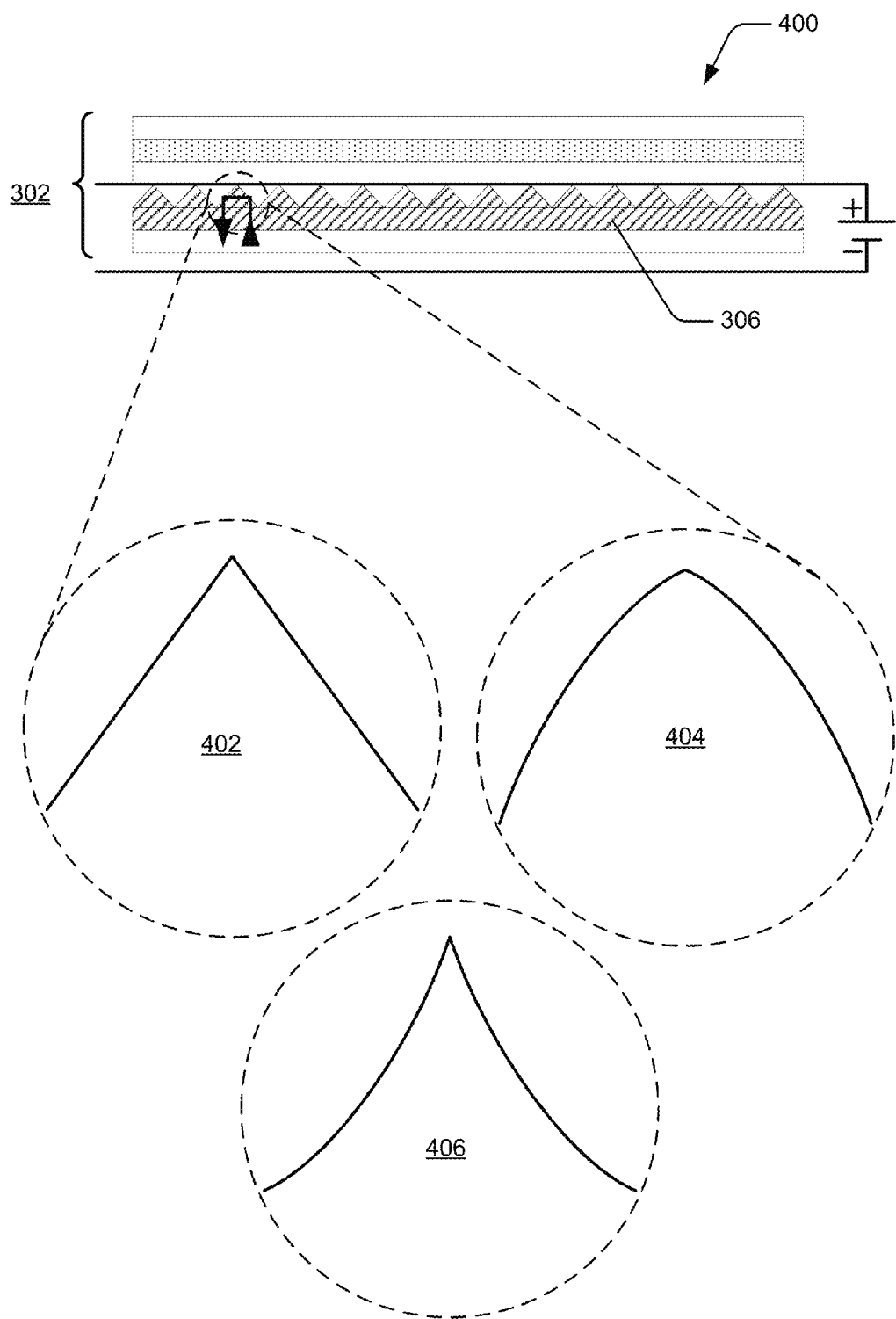
FIG. 4 illustrates example configurations of the dimming film in accordance with one or more implementations.

FIG. 4 illustrates, at 400, example configurations of the dimming film in accordance of one or more implementations of backlight dimming film techniques. In particular, FIG. 4 illustrates the cross section 302 of the display 104 along with different examples 402, 404, 406 of configurations of the dimming film 306.

The configuration of the dimming film 306 illustrated at example 402 depicts a "switch" structure. In this configuration, each switch may simply be switched on or off across the structure to block or allow light to pass through the dimming film 306. A switch can be switched on or off according to voltage applied to the dimming film 306.

The configuration of the dimming film 306 illustrated at example 404 depicts a "shutter" structure, which is curved so as to be convex to the incident light. Application of a voltage to the convex shutter at example 404 produces an optical aperture that opens from the center and expands to the edges of the structure in proportion to the applied voltage. In this way, a convex shutter may allow more than 0%, and less than 100%, of the light to pass through the dimming film 306.

The configuration of the dimming film illustrated at example 406 depicts another "shutter" structure. The shutter structure at example 406, however, is curved so as to be concave to the incident light. Application of a voltage to the concave shutter at example 406 produces an optical aperture that opens from the edges and expands to the center of the structure in proportion to the applied voltage. In this way, a concave shutter may also allow more than 0%, and less than 100%, of the light to pass through the dimming film 306.

Example Techniques

The following discussion describes techniques enabling backlight dimming film. These techniques enable local dimming for devices that have backlight lightguides (e.g., that redirect light emitted from side-firing LEDs to illuminate a display), and thus produce a "darker" or "deeper" black color for display while also reducing power consumption of those devices. These techniques can be implemented using the previously described environment, such as display 104, LEDs 106, lightguide structure 108, cover screen structure 110, dimming film 112, LED controller 120, and dimming film controller 122 of FIG. 1. These techniques include the example method illustrated in FIG. 5, which is shown as operations performed by one or more entities. The order in which operation of this method is shown or described is not intended to be construed as a limitation, and any number or combination of the described method operations can be combined in any order to implement a method, or an alternate, including that illustrated by FIG. 5.

Figure 5:
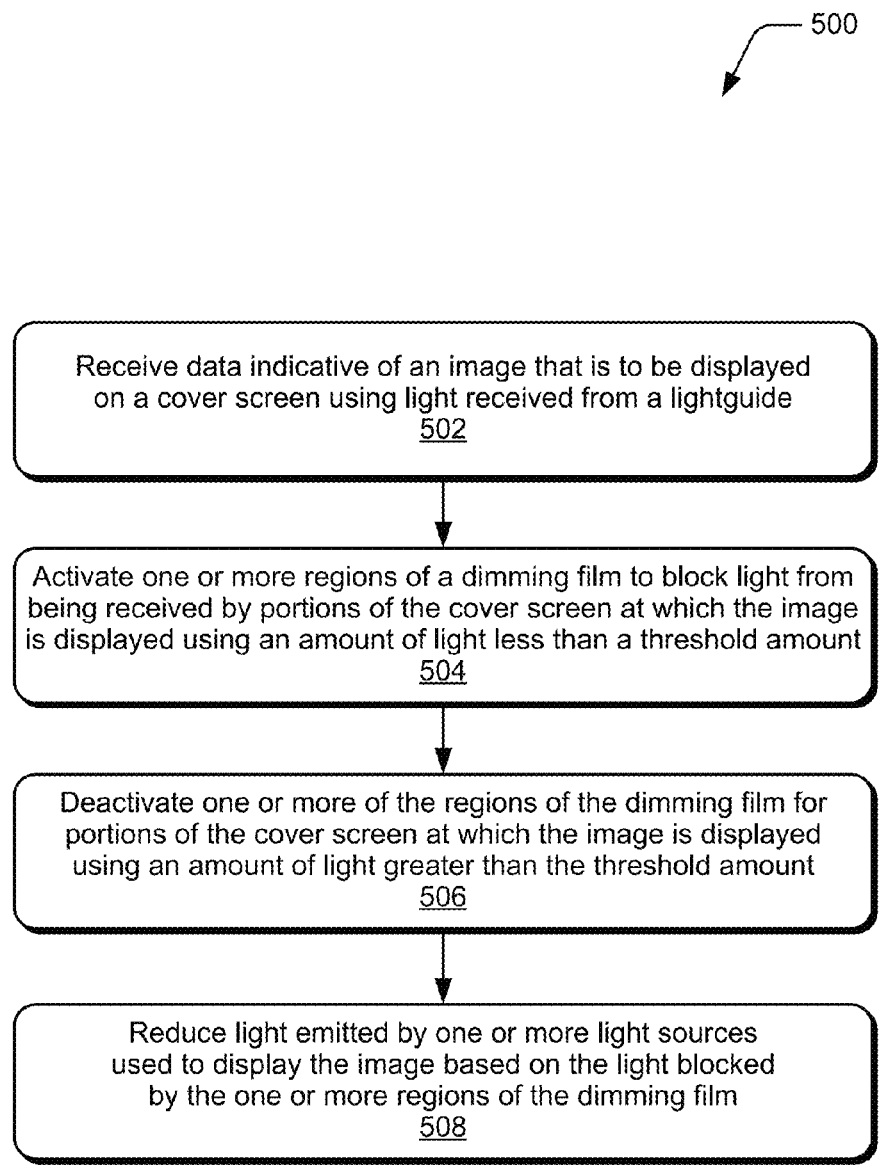
FIG. 5 illustrates an example method of activating regions of the dimming film to block light in accordance with one or more implementations.

FIG. 5 illustrates a method 500 of activating regions of the dimming film to block light.

At 502, data is received that is indicative of an image to be displayed on a cover screen using light received from a lightguide. In the context of operating environment 100, the LED controller 120 and dimming film controller 122 receive data indicative of an image or content that is to be displayed on the cover screen structure 110 of display 104. The image data received at the LED controller 120 enables the LED controller 120 to control the LEDs 106, such as by causing one or more of the LEDs 106 to emit light in a manner that is effective to form the image or content. The image data received at the LED controller 120 also enables the LED controller 120 to control an amount of light emitted by each of the LEDs 106. By way of example, the LED controller 120 may cause an LED to emit only a fraction of the light that the LED is capable of emitting.

The image data received at the dimming film controller 122 enables the dimming film controller 122 to control the dimming film 112. At 504, regions of the dimming film are activated to block light from being received by portions of the cover screen. In particular, light is blocked from portions of the cover screen at which the image is to be displayed using an amount of light that is less than a threshold amount.

In the context of operating environment 100, the image data received at the dimming film controller 122 indicates which portions of the image are to be displayed using less than a threshold amount of light. Given this data, the dimming film controller 122 can then cause an electrical field to activate one or more regions of the dimming film 112 that correspond to those portions of the image. Consequently, the regions of the dimming film 112 that are activated block light from being received at the cover screen structure 110. In other words, light is not allowed to pass through to the cover screen structure 110 where regions of the dimming film 112 are activated to block light.

At 506, regions of the dimming film are deactivated to allow light to be received by portions of the cover screen. Light is allowed, for instance, to pass through to portions of the cover screen at which the image is to be displayed using an amount of light that is greater than the threshold amount.

In the context of operating environment 100, the image data received at the dimming film controller 122 indicates which portions of an image are to be displayed using greater than a threshold amount of light. Given this data, the dimming film controller 122 can then cause an electrical field to deactivate one or more regions of the dimming film 112 that correspond to those portions of the image. Accordingly, the regions of the dimming film 112 that are deactivated allow light to pass through and be received at the cover screen structure 110. Alternately or in addition, a region of the dimming film 112 may be controlled to allow some but not all of the light to pass through the region.

At 508, the light emitted by one or more light sources to display the image is reduced based on the light blocked by the one or more regions of the dimming film. In the context of environment 100, light is emitted from LEDs 106 and redirected through the lightguide structure 108 to illuminate the cover screen structure 110. At least some of the light output from the lightguide structure 108 is blocked by regions of the dimming film 112, however. The light blocked by the dimming film 112 is then forced back into the lightguide structure 108.

The lightguide structure 108 is configured in such a way, however, that the blocked light eventually finds its way out of the lightguide structure 108 (e.g., through a portion of the lightguide structure's output surface that is not blocked by activated regions of the dimming film 112). By accounting for the light reflected back into the lightguide structure 108 and eventually used to illuminate the cover screen structure 110, the amount of light emitted by the LEDs 106 may be reduced.

Example Electronic Device

Figure 6:
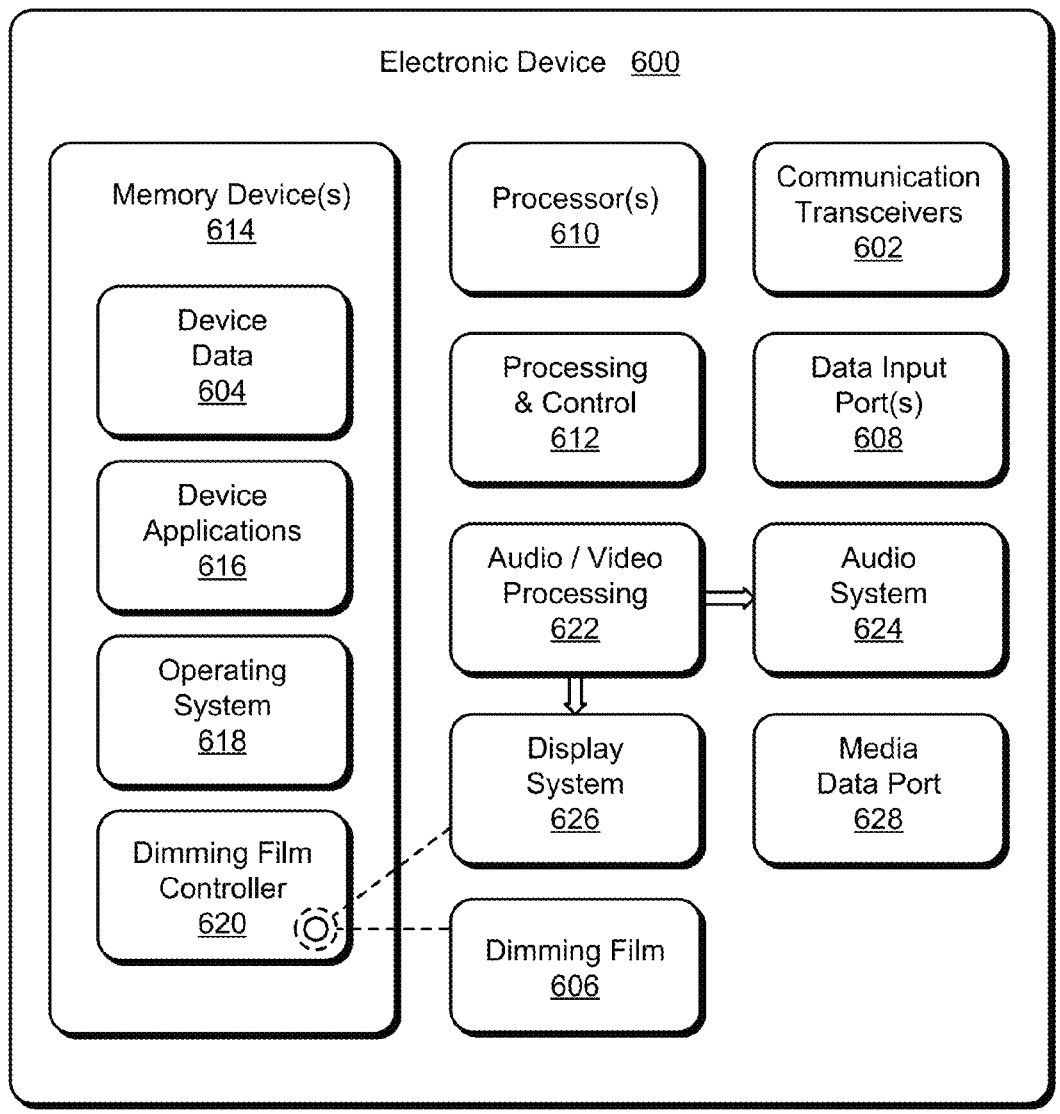
FIG. 6 illustrates various components of an electronic device that can implement backlight dimming film techniques.

FIG. 6 illustrates various components of an example electronic device 600 that can be implemented as a computing device as described with reference to any of the previous FIGS. 1 through 5. Electronic device 600 can be, or include, many different types of devices capable of implementing backlight dimming film techniques. For example, electronic device 600 may include a camera (compact or single-lens reflex), phone, personal navigation device, gaming device, Web browsing platform, pager, media player, or any other type of electronic device, such as the computing device 102 described with reference to FIG. 1.

Electronic device 600 includes communication transceivers 602 that enable wired or wireless communication of device data 604, such as received data and transmitted data. Example communication transceivers include WPAN radios compliant with various Institute of Electrical and Electronics Engineers (IEEE) 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (Wi-MAX™) standards, and wired LAN Ethernet transceivers.

In embodiments, the electronic device 600 includes dimming film 606, such as dimming film 112 as described with reference to FIG. 1. The dimming film can be implemented to facilitate various embodiments of backlight dimming film techniques. The electronic device 600 may also include sensors (not shown), such as an infrared sensor, light sensor, proximity sensor, capacitive sensor, acoustic sensor, or magnetic sensor as described above.

Electronic device 600 may also include one or more data-input ports 608 via which any type of data, media content, and inputs can be received, such as user-selectable inputs, messages, music, television content, recorded video content, and any other type of audio, video, or image data received from any content or data source. Data-input ports 608 may include USB ports, coaxial cable ports, and other serial or parallel connectors (including internal connectors) for flash memory, DVDs, CDs, and the like. These data-input ports may be used to couple the electronic device to components, peripherals, or accessories such as keyboards, microphones, or cameras.

Electronic device 600 of this example includes processor system 610 (e.g., any of application processors, microprocessors, digital-signal processors, controllers, and the like) or a processor and memory system (e.g., implemented in a system-on-chip), which process computer-executable instructions to control operation of the device. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and other hardware. Alternatively or in addition, the electronic device can be implemented with any one or combination of software, hardware, firmware, or fixed-logic circuitry that is implemented in connection with processing and control circuits, which are generally identified at 612 (processing and control 612). Although not shown, electronic device 600 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 600 also includes one or more memory devices 614 that enable data storage, examples of which include random access memory (RAM), non-volatile memory (e.g., read-only memory (ROM), flash memory, EPROM, EEPROM, etc.), and a disk storage device. Memory devices 614 are implemented at least in part as a physical device that stores information (e.g., digital or analog values) in storage media, which does not include propagating signals or waveforms). The storage media may be implemented as any suitable types of media such as electronic, magnetic, optic, mechanical, quantum, atomic, and so on. Memory devices 614 provide data storage mechanisms to store the device data 604, other types of information or data, and various device applications 616 (e.g., software applications). For example, operating system 618 can be maintained as software instructions within memory devices 614 and executed by processors 610. In some aspects, dimming film controller 620 is embodied in memory devices 614 of electronic device 600 as executable instructions or code. Although represented as a software implementation, dimming film controller 620 may be implemented as any form of a control application, software application, signal processing and control module, firmware that is installed on the device, a hardware implementation of the controller, and so on.

Electronic device 600 also includes audio and video processing system 622 that processes audio data and passes through the audio and video data to audio system 624 and to display system 626. Audio system 624 and display system 626 may include any modules that process, display, or otherwise render audio, video, display, or image data, such as dimming film controller 620. Display data and audio signals can be communicated to an audio component and to a display component via an RF (radio frequency) link, S-video link, HDMI, composite video link, component video link, DVI (digital video interface), analog audio connection, or other similar communication link, such as media data port 628. In some implementations, audio system 624 and display system 626 are external components to electronic device 600. Alternatively or additionally, display system 626 can be an integrated component of the example electronic device, such as part of an integrated display and touch interface. As described above, dimming film controller 620 may manage or control display system 626, or components thereof, in aspects of backlight dimming film.

Although embodiments of backlight dimming film have been described in language specific to features and/or methods, the subject of the appended claims is not necessarily limited to the specific features or methods described. Rather, the specific features and methods are disclosed as example implementations of a backlight dimming film.

The invention claimed is:

1. A display comprising:
   a side entry lightguide structure having a receiving side and an output surface, the lightguide structure configured to receive light through the receiving side and output the light through the output surface;
   a cover screen structure configured to display an image with a first portion of the light; and
   a dimming film disposed between the output surface and the cover screen structure, wherein a first side of the dimming film that is positioned to receive the light output from the output surface is opposite a second side of the dimming film, wherein the second side includes a plurality of facets, each having a convex or a concave shape, the dimming film configured to selectively pass a first portion of the light out through the second side to the cover screen structure, the dimming film further to selectively redirect a second portion of the light through the first side back into the lightguide structure, wherein based on an index of refraction of the dimming film, the plurality of facets of the dimming film internally reflects the second portion twice at the second side while the second portion propagates in the dimming film, wherein the dimming film is configured to change the index of refraction in response to an application of an electrical field;
   wherein the cover screen structure is configured to receive the second portion from the lightguide structure after redirection of the second portion by the dimming film.

2. The display as recited in claim 1, wherein the image is dimmed at portions of the cover screen structure where light is blocked by the dimming film.

3. The display as recited in claim 2, wherein an amount the image is dimmed varies according to the application of the electrical field in at least one region of the dimming film where the light is blocked.

4. The display as recited in claim 1, wherein the image is not dimmed at portions of the cover screen structure where light is not blocked by the dimming film.

5. The display as recited in claim 1, wherein the dimming film is configured to selectively block the light at a particular time such that:
   at least a portion of the light output from the output surface of the lightguide structure at the particular time is blocked from being received at the cover screen structure in at least one region; and
   at least another portion of the light output from the output surface of the lightguide structure at the particular time is not blocked from being received at the cover screen structure outside the at least one region.

6. The display as recited in claim 1, wherein the dimming film is configured to selectively block the light such that a portion of the light output from the output surface of the lightguide structure in at least one region is blocked at one time by the dimming film and is not blocked at another time by the dimming film.

7. The display as recited in claim 1, wherein the dimming film comprises a plurality of regions, each region configured to be activated individually to block the light that is output by a portion of the output surface of the lightguide structure covered by that region.

8. The display as recited in claim 1, wherein the dimming film comprises a plurality of regions, wherein one or more regions of the plurality of regions are to be activated at a particular time to block light that is output from one or more corresponding portions of output surface of the lightguide structure, the one or more regions covering the corresponding one or more portions of the output surface.

9. The display as recited in claim 1, wherein the dimming film is configured to selectively block light output from the output surface of the lightguide structure from being received at the cover screen structure for a first configuration of the lightguide structure or a second configuration of the lightguide structure that is different than the first configuration.

10. The display of claim 1, wherein the plurality of facets includes alternating first and second facets, wherein one of the first facets and one of the second facets form an optical aperture that changes in size based on the application of the electrical field, and wherein the size of the optical aperture determines a transmittance of the dimming film proximate to the optical aperture.

11. The display of claim 1, wherein the cover screen includes a first electrode disposed proximate to the second side of the dimming film, wherein the lightguide structure is disposed between the dimming film and a second electrode, and wherein the application of the electrical field is generated by applying a voltage bias between the first electrode and the second electrode.

12. A device comprising:
   a housing;
   a display disposed at least partially within the housing and forming part of a surface of the device, the display including a cover screen and a dimming film, the cover screen configured to display an image using light output from a lightguide, the dimming film disposed between the cover screen and the lightguide, wherein a first side of the dimming film that is positioned to receive the light output from the lightguide is opposite a second side of the dimming film, the second side including a plurality of facets, each having a convex or a concave shape; and
   a dimming film controller disposed within the housing and configured to activate one or more regions of the dimming film to block portions of the cover screen that correspond to the one or more regions from receiving light from the lightguide;
   wherein, responsive to the dimming film controller, the dimming film:
      to selectively pass a first portion of the light out through the second side of the dimming film to the cover screen; and
      to selectively redirect a second portion of the light output from the lightguide through the first side back into the lightguide, wherein based on an index of refraction of the dimming film, the plurality of facets of the dimming film internally reflects the second portion while the second portion propagates in the dimming film, wherein the dimming film is configured to change the index of refraction in response to an application of an electrical field;
   wherein the cover screen is configured to receive the second portion from the lightguide after redirection of the second portion by the dimming film.

13. The device as recited in claim 12, further comprising a plurality of light-emitting diodes (LEDs) disposed on a single side of the housing, the plurality of LEDs configured to emit light in a direction that is parallel to an output surface of the lightguide.

14. The device as recited in claim 13, wherein the lightguide has a receiving side that is substantially perpendicular to the output surface, the lightguide configured to receive the light emitted from the LEDs through the receiving side and redirect the light so that it is output through the output surface.

15. The device as recited in claim 12, wherein the dimming film controller is further configured to deactivate one of more of the regions that are activated, wherein portions of the cover screen that correspond to those regions that are deactivated are not blocked from receiving light from the lightguide.

16. The device as recited in claim 12, wherein:
   the dimming film controller is further configured to vary an amount of light that is blocked by the one or more regions of the dimming film; and
   the portions of the cover screen at which the light is blocked dim the image displayed at those portions according to the amount of light that is blocked by the one or more regions.

17. The device as recited in claim 16, wherein the dimming film controller is further configured to cause the application of the electrical field to each of the one or more regions individually to vary the amount of light that is blocked by each of the one or more regions.

18. A method comprising:
   receiving data indicative of an image that is to be displayed on a cover screen of a display device using light output from a lightguide of the display device; and
   activating one or more regions of a dimming film disposed between the cover screen and the lightguide, including changing an index of refraction of the dimming film in response to an application of an electrical field;
   based on the activating:
      selectively passing a first portion of the light out through the dimming film to the cover screen, wherein the dimming film is positioned to receive the light output from the lightguide via a first side of the dimming film, wherein the first side is opposite a second side of the dimming film, wherein the second side includes a plurality of facets, each having a convex or a concave shape; and selectively redirecting a second portion of the light received by the dimming film through the first side and back into the lightguide via the plurality of facets of the dimming film internally reflecting the second portion twice, based on the index of refraction, while the second portion propagates in the dimming film;

after selectively redirecting the second portion:

directing the second portion from the dimming film to the lightguide; and directing the second portion from the lightguide to the cover screen.

19. The method as recited in claim 18, further comprising changing an amount of light that is blocked by the one or more regions of the dimming film in response to receiving data indicative of a different image that is to be displayed on the cover screen.

20. The method as recited in claim 18, further comprising deactivating one or more of the regions of the dimming film for portions of the cover screen at which the image is to be displayed using an amount of light that is greater than a threshold amount.

21. The method as recited in claim 18, further comprising reducing light emitted by one or more light sources to display the image, wherein an amount that the light emitted is reduced is based on the light blocked by the one or more regions of the dimming film.

\* \* \* \* \*